(12) United States Patent
Ramsay et al.

(10) Patent No.: US 9,021,397 B2
(45) Date of Patent: Apr. 28, 2015

(54) VISUALIZATION AND INTERACTION WITH FINANCIAL DATA USING SUNBURST VISUALIZATION

(75) Inventors: Neil Ramsay, Madrid (ES); Terrance Wampler, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 687 days.

(21) Appl. No.: 13/048,781

(22) Filed: Mar. 15, 2011

(65) Prior Publication Data

US 2012/0240064 A1    Sep. 20, 2012

(51) Int. Cl.
G06F 3/048 (2013.01)
G06T 11/00 (2006.01)
G06F 17/30 (2006.01)
G06F 3/01 (2006.01)

(52) U.S. Cl.
CPC .......... *G06T 11/00* (2013.01); *G06F 17/30572* (2013.01)

(58) Field of Classification Search
CPC .............. G06F 3/0482; G06F 3/04817; G06F 17/30994
USPC .................. 715/764, 834, 835, 762
See application file for complete search history.

(56) References Cited

U.S. PATENT DOCUMENTS

| | | | |
|---|---|---|---|
| 6,219,053 B1 * | 4/2001 | Tachibana et al. | 715/835 |
| 6,359,635 B1 * | 3/2002 | Perttunen | 715/834 |
| 6,856,313 B2 * | 2/2005 | Gossweiler et al. | 345/419 |
| 7,046,248 B1 * | 5/2006 | Perttunen | 345/440 |
| 7,250,951 B1 | 7/2007 | Hurley et al. | |

(Continued)

OTHER PUBLICATIONS

Jiang, Wei, et al., "Information Visualization of an agent based financial system", obtained at http://ideas.repec.org/p/sce/scecf5/468.html; Nov. 11, 2005; 2 pages.

(Continued)

*Primary Examiner* — Nicholas Augustine
(74) *Attorney, Agent, or Firm* — Trellis IP Law Group, PC

(57) ABSTRACT

A system and method for illustrating and interacting with data. An example method includes grouping data according to two or more user-specified dimensions and determining one or more hierarchical relationships between the two or more user-specified dimensions. Plural bands are depicted in a first order based on the one or more intrinsic hierarchical relationships. A first user option enables a user to selectively change the first order to a second order, thereby selectively changing the one or more hierarchical relationships. In an illustrative embodiment, the data includes financial data. The plural bands illustrate only those bands that the user has access permissions or privileges to view. A second user option enables a user to selectively omit one or more of the plural bands while maintaining the one or more hierarchical relationships between remaining displayed bands. Additional user options enable a user to adjust a hierarchical relationship used to depict the plural bands; to trigger tabular view of underlying data, and so on. In a specific embodiment, the bands include concentric bands or rings displayed in a sunburst visualization.

20 Claims, 7 Drawing Sheets

(56) References Cited

U.S. PATENT DOCUMENTS

| | | | |
|---|---|---|---|
| 7,353,457 B2* | 4/2008 | Scheu et al. | 715/764 |
| 2001/0011242 A1 | 8/2001 | Allex et al. | |
| 2002/0015034 A1* | 2/2002 | Malmborg | 345/204 |
| 2002/0122072 A1* | 9/2002 | Selker | 345/834 |
| 2003/0106057 A1* | 6/2003 | Perdon | 725/45 |
| 2003/0137541 A1* | 7/2003 | Massengale et al. | 345/764 |
| 2004/0268268 A1* | 12/2004 | Scheu et al. | 715/835 |
| 2007/0256029 A1* | 11/2007 | Maxwell | 715/834 |
| 2008/0307369 A1* | 12/2008 | Liu et al. | 715/855 |
| 2009/0319931 A1 | 12/2009 | Hutchings et al. | |
| 2011/0055760 A1* | 3/2011 | Drayton et al. | 715/834 |

OTHER PUBLICATIONS

Tree Drawing: Sunburst Diagram, obtained at http://animatroid.wordpress.com/2008/08/03/sunburst-an-effective information-visualization/; Sep. 16, 2010; 4 pages.

Webber, Richard, et al., "Space-filling Techniques in Visualizing Output from Computer Based Economic Models", obtained at http://ideas.repec.org/p/sce/scecfa/67.html; Jul. 4, 2006; 2 pages.

Visualization of Semantic Knowledge Based on an Improved Sunburst Visualization Metaphor; obtained at http://en.scientificcommons.org/59417712; Sep. 16, 2010; 1 page.

* cited by examiner

VISUALIZATION AND INTERACTION WITH FINANCIAL DATA USING SUNBURST VISUALIZATION

BACKGROUND

The present application relates to software and more specifically to user interface designs and methods for graphically displaying and interacting with information and/or concepts.

Software for facilitating information visualization is employed in various demanding applications, including scientific research, digital libraries, data mining, financial data analysis, market studies, manufacturing production control, drug discovery, and so on. Such applications often demand striking displays for illustrating different groups of data and relationships therebetween.

Information visualization may be any process involving graphically representing data according to a method or scheme. A graphical representation of data resulting from an information visualization technique is often called a visualization. Example visualizations include pie charts, treemaps, bar charts, graphs, and so on.

Effective visualization techniques are particularly important for visualizing complex financial data sets, where visually striking and useful displays may improve business operations, economic forecasting, and so on. For the purposes of the present discussion, financial data may be any information pertaining to a business operation or financial transaction(s). Examples of financial data include invoice numbers, business contact records and information, sales data, invoice data, purchase order data, employee data, customer data, supplier data, market data, customer geographical information, cash flow records, and so on.

Conventionally, financial data visualization techniques involve using pie charts, bar charts, graphs, and so on. Use of these techniques is often limited to displaying a single data dimension or hierarchy level. Such limited visualization techniques may inhibit informed decision making.

SUMMARY

An example method for illustrating data includes grouping data according to plural user-specified dimensions; determining one or more hierarchical relationships between the plural user-specified dimensions; depicting plural bands in a first order based on the one or more hierarchical relationships; and providing a first user option to change the first order to a second order, thereby selectively changing the depicted one or more hierarchical relationships.

In an illustrative embodiment, the data includes financial data. The plural bands illustrate only those bands that the user has access permissions or privileges to view. A second user option enables a user to selectively omit one or more of the plural bands while maintaining the one or more hierarchical relationships between remaining displayed bands. An accompanying user interface includes an interface control that enables a user to adjust a hierarchical relationship used to depict the plural bands.

In a specific embodiment, the bands include concentric bands, which are displayed as rings in a sunburst visualization. Each of the rings includes one or more sectors, which are sortable according to a user-specified criterion. Another user option enables a user to select a sector sizing criterion for sizing of depicted sectors of depicted bands. The resulting data visualization illustrates an inner most ring corresponding to the first band and an adjacent ring corresponding to the second band. The data visualization represents a graphical representation of an intrinsic hierarchy, wherein adjacent hierarchy levels or dimensions correspond to adjacent rings. More central rings represent higher levels in the hierarchy than outer rings. Another user option enables a user to alter the displayed graphical representation and accompanying hierarchy by selectively changing an order of the rings.

Another user option enables a user to trigger generation of a new graphical representation characterized by a central ring that corresponds to a user selected ring or sector other than a previously displayed central ring. The new graphical representation omits display of one or more rings or sectors that were more centrally positioned than the user selected ring in a previous graphical representation. This operation corresponds to a filter/focus operation, as displayed data is effectively filtered to isolate the structure of a selected ring or sector and its children, i.e., data categories, levels, and/or dimensions that are lower or more subordinate in the hierarchy than the selected ring or sector.

Another user option enables a user to trigger tabular display of the data underlying a particular data visualization. An application associated with the data, e.g., an application that was used to enter the data, may be activated in response to selection of the user option.

Hence, certain embodiments disclosed herein provide effective mechanisms for thoroughly visualizing and manipulating the display of complex financial data sets and accompanying relationships, such as via sunburst visualization methods and user interfaces disclosed herein. Such informative information visualization techniques may enable users to more effectively extract desired information and relationships from large data sets, which may include invoices, purchase orders, customer contacts, and so on. Extracted information may increase enterprise situational awareness, potentially leading to improved financial forecasting and more informed business decisions in general. Enterprises can now efficiently render large hierarchical and multi-dimensional financial data sets to enable discerning trends, patterns, and anomalies that would otherwise be obscured in several different pages of figures or reports. The sunburst visualizations discussed herein also offer various user options for interacting with the visualizations to perform various informative operations, including inquiry and reporting operations such as drill, pivot, and filter within the visualization itself. These capabilities may help to improve business profitability.

A further understanding of the nature and the advantages of particular embodiments disclosed herein may be realized by reference of the remaining portions of the specification and the attached drawings.

DETAILED DESCRIPTION OF EMBODIMENTS

Figure 1:
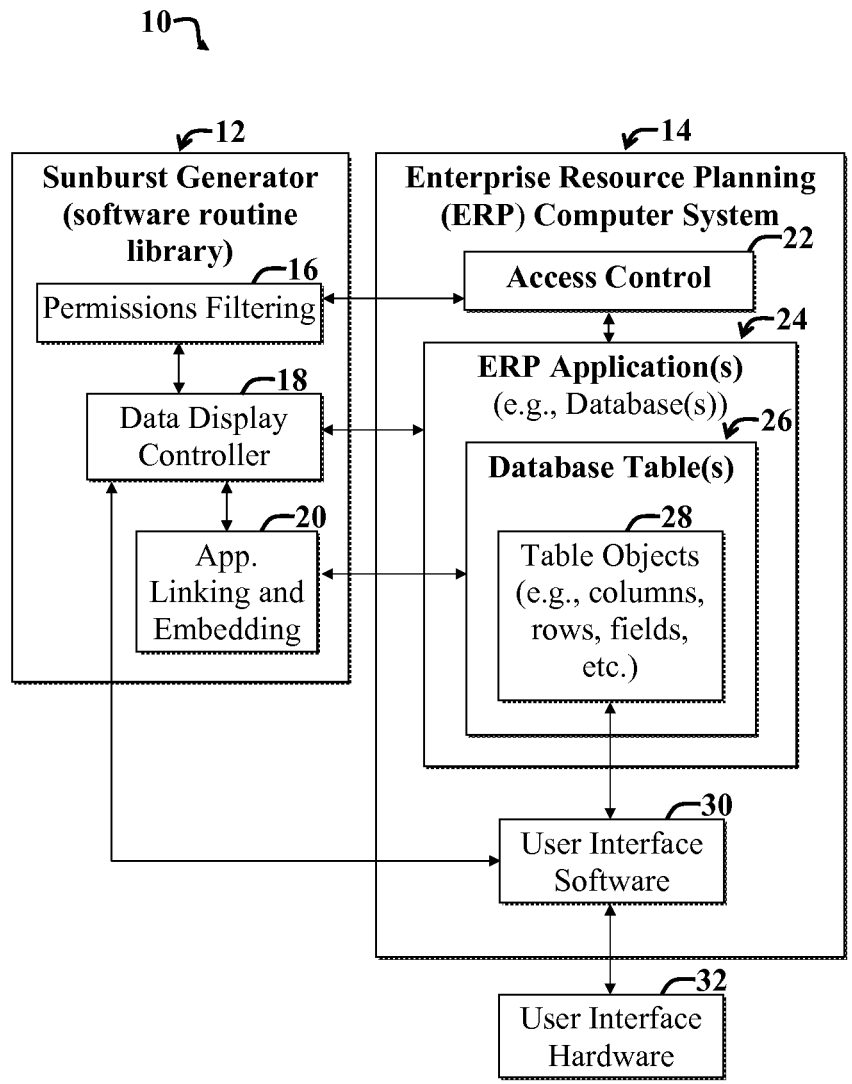
FIG. 1 is a diagram illustrating a first example embodiment of a system for facilitating rendering sunburst visualizations of financial data.

Although the description has been described with respect to particular embodiments thereof, these particular embodiments are merely illustrative, and not restrictive.

While the present application is discussed with respect to the use of sunburst visualizations for rendering financial data, embodiments are not limited thereto. For example, visualizations and accompanying interaction methods disclosed herein may facilitate rendering virtually any data set with related components that can be grouped into different categories.

Furthermore, while the sunburst visualizations disclosed herein include plural disc-shaped concentric rings comprising one or more sectors, embodiments are not limited thereto. For example, various rings or discs of the sunbursts may exhibit different form factors or outlines, such as oval, octagonal, and so on. Furthermore, while the sunbursts disclosed herein exhibit a substantially closed inner ring, i.e., a ring which subtends a 360-degree angle, embodiments are not limited thereto. For example, certain sunbursts may be unfolded, such that bands or rings that previously subtended a 360-degree arc now subtend a smaller angle, without departing from the scope of the present teachings.

For the purposes of the present discussion, a sunburst visualization (also simply called sunburst) may be any graphical representation of data that includes plural concentric rings or portions thereof, where each ring represents or is associated with a category, dimension, or other level characterizing the data. An example sunburst visualization includes plural concentric rings or bands, each of which represents a different dimension or, when displaying an extrinsic hierarchy, hierarchical level. Sunburst visualizations may be used to illustrate data hierarchy relationships between different data dimensions, categories, or levels. Certain sunburst visualizations may be considered angular charts, also called radial space-filling visualizations or polar-form tree-icicle visualizations.

Sunburst visualizations as discussed herein may render large hierarchical and multi-dimensional data sets in ways that enable users to discern trends, patterns and anomalies that would otherwise be obscured in several different pages of figures, reports or gadgets. Such sunburst visualizations may facilitate understanding large amounts of financial data by efficiently and intuitively graphically conveying information. Such techniques are often particularly useful for displaying multidimensional information.

For the purposes of the present discussion, multidimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an extrinsic sub-hierarchy of an intrinsic hierarchy that includes the location dimension. In general, extrinsic hierarchies include various data levels, while intrinsic hierarchies may include several dimensions that may include different data levels.

Financial data is often characterized by a hierarchy. For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

Data hierarchies may be categorized as extrinsic and/or intrinsic hierarchies. Extrinsic hierarchical representations of data are organized according to hierarchical relationships inherent within the data. Such hierarchical relationships are often based on persistent data attributes characterizing the data. An example of an extrinsic hierarchy includes information about cities arranged by country, state, county, and so on. Another example, may be a human resources hierarchy, which depicts a corporate structure, where employees are subordinate to project managers, which are subordinate to regional directors, and so on. In general, extrinsic hierarchies are defined and maintained irrespective of the visualization technique used to display the data.

For the purposes of the present discussion, an intrinsic hierarchical representation, i.e., intrinsic hierarchy, may refer to an organization of data and relationships that is user instantiated by choices made to display and/or analyze the data. Hence, certain intrinsic hierarchies may be implied from the way that users classify and summarize detailed amounts or metrics by different data dimensions on reports and analytics. Each level of an intrinsic hierarchy may correspond to a data dimension displayed in a report or analytic. A data dimension may be any category or classification of an amount or category.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

FIG. 1 is a diagram illustrating a first example embodiment of a system 10 for facilitating rendering sunburst visualizations of financial data. The system 10 includes a sunburst generator module 12, which may be implemented as middleware, in communication with an Enterprise Resource Planning (ERP) 14, which may be implemented in software running on one or more computers and/or computer networks.

The ERP system 14 includes various ERP applications 24, such as databases. Example ERP databases include, but are not limited to, General Ledger (GL), Human Resources (HR), Supply Chain Management (SCM), Customer Relationship Management (CRM), and Project Management (PM) databases. For illustrative purposes, the ERP applications 24 are shown including database tables 26 with accompanying table objects 28, such as columns, rows, fields, and so on. The ERP system 14 further includes user interface software 30 in communication with user interface hardware 32, and an access control module 22 in communication with the ERP applications 24.

The sunburst generator 12 includes a library of routines, e.g., functions and procedures supporting modules 16-20 therein. A permissions filtering module 16 communicates with a data display controller 18, which communicates with an application linking and embedding module 20. The permissions filtering module 16 of the sunburst generator 12 communicates with the access control module 22 of the ERP system 14. The data display controller 18 further communicates with the ERP applications 24 and the user interface software 30.

While the user interface software 30 is shown residing on the ERP system 14, note that the user interface software 30 may include one or more modules running on the sunburst generator 12. Furthermore, the sunburst generator 12 may include a separate user interface with accompanying software and hardware.

In general, while various modules of the system 10 are shown as including separate modules, various modules may be combined without departing from the scope of the present teachings. For example, the sunburst generator 12 may be incorporated into the ERP applications 24 in certain implementations. In other implementations, the sunburst generator 12 may act as middleware that provides functionality, such as via one or more libraries of computer routines, that may be shared among different software applications and computer systems.

In operation, a user employing an ERP application 24, such as a database, may wish to view data, e.g., financial data maintained by the database, via a sunburst visualization. Functionality of the sunburst generator 12 may be invoked via one of the ERP applications 24 or may be invoked separately to render data objects 28 via a sunburst visualization, as discussed more fully below.

In one operative scenario, a user employs the user interface hardware 32 and software 30 to activate software corresponding to the sunburst generator 12. The sunburst generator 12 then employs the display controller 18 to analyze predetermined data, e.g., the table objects 28 of the ERP applications 24 and to render a default sunburst visualization in response thereto. The user interface software 30 may include one or more routines for configuring what data is displayed and how it is displayed in a default sunburst visualization.

Data displayed via the sunburst visualization is limited to data that is viewable to a user of the ERP application 24. The access control module 22 may include one or more Access Control Lists (ACLs) specifying which users have access to or are otherwise granted permission to view data. Similarly, if a user has been granted permissions (as specified via an ACL in the access control module 22) to view data but has not been granted permissions to modify the data, then data manipulation or brushing features provided by the sunburst generator 12 will be limited for that user accordingly.

Preferably, security for data displayed in sunburst visualization is consistent with the context in which it is displayed. For example, if a sunburst visualization is embedded in a subledger application page(s), the user may see operational balances for transactions that they have access to by virtue of business unit, user profile, etc. security.

The permissions filtering module 16 is adapted to selectively access the access control module 22 and any user login information input to the user interface software 30 to adjust what data the data display controller 18 retrieves and displays for the user.

When viewing a visualization, e.g., via the user interface hardware 32 and software 30, a user is provided an option to display the visualization in tabular format, i.e., as a table, such as by activating underlying software used to enter or maintain the data. In response to user selection of such an option via the user interface software 30, the display controller 18 activates the application linking and embedding module 20 to activate the ERP application 24 used to generate or maintain the underlying data. The activated ERP application 24 may then be used to view the data in tabular format. Alternatively, the data display controller 18 uses the data extracted to generate the sunburst visualization to generate a table of the data, which may be displayed adjacent to a sunburst visualization.

Various additional user interface features and functions, which may be activated from a display screen illustrating a sunburst visualization, are discussed more fully below with reference to FIGS. 2-5. Such features may be implemented via one or more routines running on the user interface software 30 and the sunburst generator 12 in communication with the ERP application 24.

Figure 2:
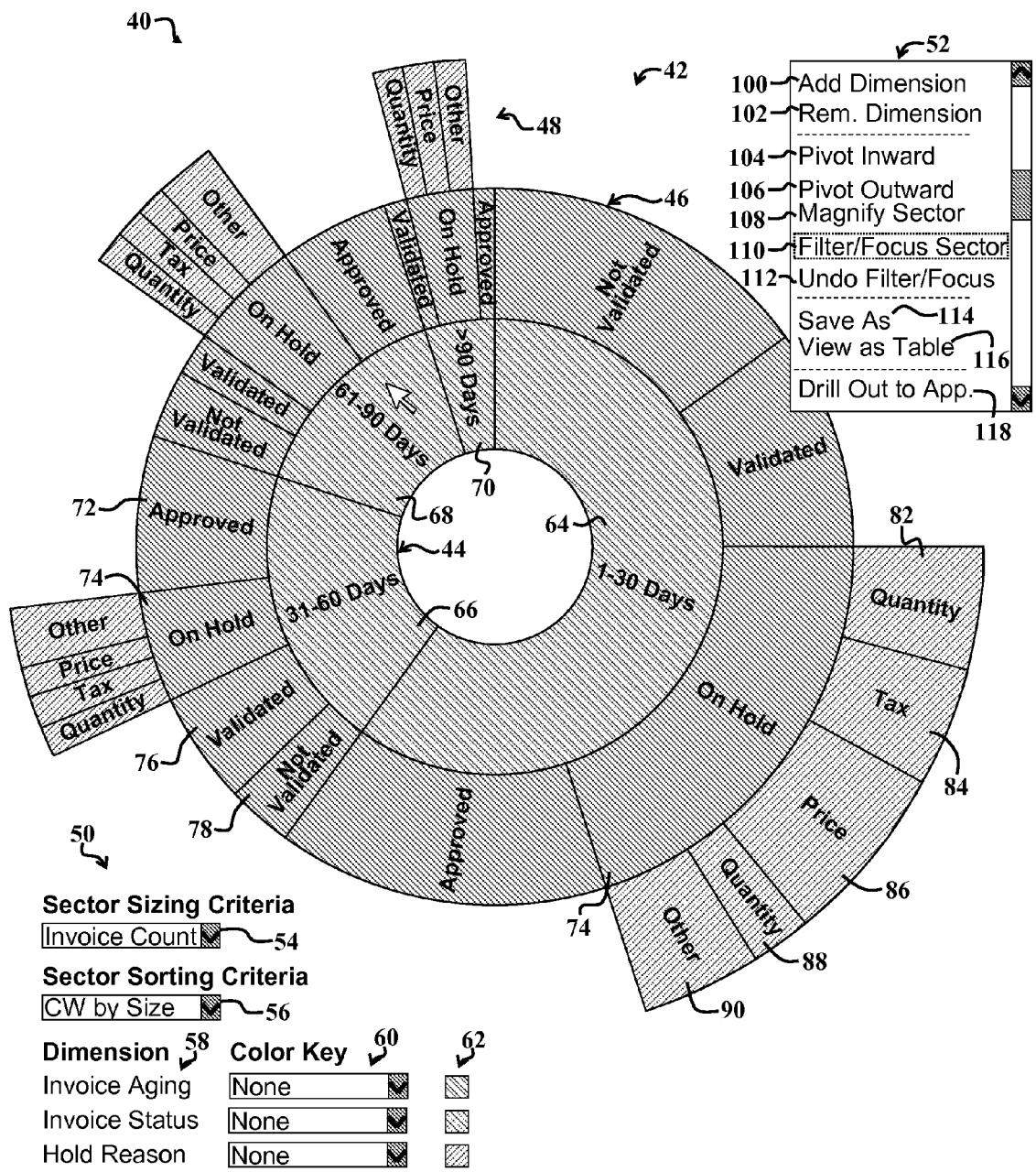
FIG. 2 is a first example user interface screen illustrating a first example sunburst visualization and accompanying user interface controls.

FIG. 2 is a first example user interface display screen 40 illustrating a first example sunburst visualization 42 and examples of accompanying user interface controls 50, 52. The sunburst visualization 42 includes various rings 44, 46, 48, including an inner ring 44, a middle ring 46, and an outer ring region 48. The outer ring 48 includes missing portions, i.e., missing sectors, which are left blank.

For the purposes of the present discussion, a ring may be any band that subtends a predetermined angle about a central point or region. A fully closed ring subtends a 360-degree angle. A sector may be any portion of a ring. Hence, a sector may be a particular type of ring, which may subtend an angle less than 360-degrees. In a special case where a closed ring comprises a single sector, the sector represents a fully closed ring. A ring need not necessarily be hollow. For example, an inner ring may be a solid circle or other shape. Similarly, a ring need not necessarily have a circular outline. For example, ovals or other form factors are possible.

The example sunburst visualization 42 is used to display information about a set of invoices, various attributes of which comprise the underlying data used to generate the visualization 42. This underlying data may be retrieved from an application, such as an ERP database (e.g., the ERP application(s) 24 of FIG. 1). The invoice attributes are grouped in specific amount categories, called dimensions, including an invoice-aging dimension corresponding to the inner ring 44, an invoice-status dimension corresponding to the middle ring 46, and a hold-reason dimension corresponding to the outer ring 48.

In the sunburst visualization 42, each ring 44, 46, 48 is color-coded or shaded to identify the dimension associated with the ring. Such color-coding is user-configurable via a first set of user interface controls 50. The first set of user interface controls 50 includes a listing 58 of dimensions adjacent to corresponding dimension-color drop-down menus 60. A user may select a desired color for a particular dimension from the drop-down menus 60 adjacent to the dimension listing 58. Indicators 62 illustrate the current color or shading applied to a particular dimension or ring.

Each amount category or grouping of attributes associated with a particular dimension in the sunburst visualization 42 of FIG. 2 includes plural sub-dimensions. The sub-dimensions may be levels. A level may be a dimension of an extrinsic hierarchy or may be a sub-dimension of a dimension of an intrinsic hierarchy, wherein the sub-dimension may be based on a grouping inherent or persistent in the data. Note that a given intrinsic hierarchy may have components or branches that represent extrinsic hierarchies. In cases where no extrinsic hierarchical relationships are illustrated in a sunburst visualization, sub-dimensions used to create sectors of a ring corresponding to a dimension are preferentially called sub-dimensions as opposed to levels.

An invoice-aging dimension corresponding to the inner ring 44 includes sub-dimensions of 1-30 days, 31-60 days, 61-90 days, and greater than 90 days, which are displayed as invoice-aging sectors 64, 66, 68, 70, respectively. In the present embodiment, the size of each sector 64-70 is scaled according to the number of invoices associated with each particular aging status. The number of invoices is considered a data attribute of the data associated with a sector. The sector sizing criterion may be altered via a global sector sizing drop-down menu 54, or via a ring-specific option provided via a right-click menu, as discussed more fully below.

For the purposes of the present discussion, a sector sizing criterion may be any specification of a parameter characterizing data, where the parameter is used to adjust sizes of sectors in accordance therewith. An example of another possible sector sizing criterion (other than invoice count) includes summed invoice values in a particular currency.

The invoice-status dimension corresponding to the middle ring 46 includes example sub-dimensions of approved, on hold, validated, and not validated, which are displayed as invoice-status sectors 72-78, respectively. Each invoice-status sector 72-78 is sized according to the invoice count (or other user selected criterion), i.e., the number of invoices associated with each invoice-status sector 72-78 and according to the size of each portion of the adjacent invoice-aging sector 64-70 that is subtended by the angle of the invoice-status sector 72-78. For example, a relatively large group of invoices that have aged between 1-30 days (sector 64 of the inner ring 44) include approved, on-hold, validated, and not validated invoices, as illustrated by adjacent sectors in the middle ring 46 corresponding to the invoice-status dimension.

In general, sectors of an outer ring that are adjacent to and that are subtended by larger sectors of an inner ring are considered as included in the dimension of the inner ring and the sub-dimension of an adjacent larger sector of the inner ring. Hence, a line drawn from any position within a sector of an outer ring to the center of the sunburst visualization 42 will cross sectors and inner rings that represent dimensions or sub-dimensions associated with the outer sector from which the line is drawn.

The sunburst visualization 42 may be considered a hierarchical representation of underlying data or data attributes, where adjacent hierarchy dimensions or levels correspond to adjacent rings, and where central rings represent higher levels in the hierarchy than outer rings. The term "higher" as used herein does not necessarily mean physically higher, but rather refers to a relative position in a hierarchy, where the position refers to a less subordinate position in the hierarchy. For example, the 1-30 day inner sector 64 is said to be positioned higher in the represented hierarchy than the corresponding on-hold sector 74 of the middle ring 46 that angularly overlaps or subtends the on-hold sector 74.

The hold-reason dimension corresponding to the outer ring 48 includes sub-dimensions of quantity, tax, price, quality, and other, which correspond to hold-reason sectors 82-90, respectively. Note that only the on-hold sectors 74 of the middle ring 46 are associated with a hold reason graphically depicted in the outer ring 48. Remaining sectors of the outer ring 48 are left blank. Sectors of an outer ring, such as the ring 48, which that are associated with a sector of an inner ring, such as the on-hold sector 74 (which is subtended by the 1-30 day sector 64 of the inner ring 44) of middle ring 46, are collectively sized to fill the angular portion of the outer ring 48 corresponding to the associated sector 74 of the middle ring 46.

Sectors within a given ring, such as the inner ring 44, may be sorted according to a user selectable sorting criterion. For example, a user may employ a global sector sorting-criteria drop-down menu 56 to select a sector sorting criterion. Examples of sorting criterion include sort counterclockwise according to decreasing sector size (e.g., starting from the top of the sunburst visualization 42), clockwise according to sector size, clockwise alphabetically according to sector label, counterclockwise according to sector label, and so on. Alternatively, a user may use a right-mouse click on a particular ring or sector to display a menu with an option to select sector sorting criteria specific to a particular ring. In the present embodiment, sectors 64-70 of the inner ring 44 are sorted, i.e., arranged relative to each other, according to sector size. The sector size is determined according to a sector sizing criterion applied to an attribute of the underlying data, where the attribute is used to define sectors of a ring, i.e., sub-dimensions of the dimension represented by the ring.

Since, an important visual aid to the size of a sector is the order in which it is displayed, the sorting of sectors does not break the hierarchical relationship between sectors in different rings. Sectors may be sorted, by default, from largest to smallest sizing factor within the inner ring's parent sector.

Parameters, criterion, and other information associated with a given sector may be displayed via a mouse-over hover layer. A user option for enabling a user to configure what type of information is displayed via a hover layer upon mouse-over of a particular sector may be provided via a right-click drop-down menu, such as the menu 52, or via another mechanism, such as a menu bar or tool bar.

Additional user options for interacting with the sunburst visualization 42 may be provided via the right-click menu 52. The right-click menu 52 may be activated by right-clicking on the sunburst visualization 42. Example additional user interface options that may be provided include add dimension 100, remove dimension 102, pivot toward the center 104, pivot away from the center 106, magnify sector 108, filter/focus sector 110, undo filter/focus 112, save as 114, view as table 116, and drill out to application 118.

The add dimension menu item (user interface control) 100 provides a user option to add an additional ring to the sunburst visualization 42 by virtue of the addition of a dimension. Selection of the add dimension menu item 100 may cause an additional dialog box (not shown) to appear, where the dialog box enables a user to specify underlying data to use to form the additional ring corresponding to the dimension to be added. The remove dimension menu item 102 provides a user option to remove a particular ring from the sunburst visualization 42. If a ring, such as the middle ring 46 is removed, the sunburst visualization 42 is automatically reconfigured, e.g., by the data display controller 18 of FIG. 1, so that appropriate hierarchical relationships are maintained.

Similarly, if one ring is interchanged with another, the sunburst visualization 42 is automatically reconfigured so that hierarchical relationships are maintained. A user may move rings in a visualization, such as by right-clicking a particular ring and selecting the pivot towards center menu item 104 or by selecting the pivot away from center menu item 106. A ring that is pivoted toward the center is moved inward one position, such that the ring's position in the sunburst visualization 42 is interchanged with the immediately adjacent inner ring. Similarly, the position of ring that is pivoted away from the center is interchanged with the immediately adjacent outer ring.

Selection of the magnify sector 108 menu item may invoke functionality for implementing an angular detail method (e.g., John Stasko's angular detail method) or fish-eye lens technique. This functionality may be implemented via one or more routines running on the data display controller 18 and/or user interface software 30 of FIG. 1.

Such a sector magnification technique may cause selective expansion or magnification of a particular sector and concomitant display of a shrunken version of the sunburst visualization 42. An angle over which a sector is expanded, and other expansion characteristics may be adjusted via user interface controls. Those skilled in the art with access to the present teachings may readily implement a sector magnification technique as discussed herein without undue experimentation.

The filter/focus menu item 110 provides a user option to cause generation of a new sunburst visualization, wherein the inner most ring of the resulting visualization corresponds to the sector that was right-clicked to activate the right-click menu 52, as discussed more fully below with reference to FIG. 3, which demonstrates a resulting sunburst visualization after a filter/focus operation is applied to the 61-90 day sector 68 of the inner ring 44.

The undo filter/focus menu item 112 provides a user option to return to a previously displayed sunburst visualization, which was displayed prior to implementation of a filter/focus operation via the filter/focus menu item 110. In this case, a center ring the sunburst visualization may revert back to a position as a sector in a resulting sunburst visualization.

The save as menu item 14 provides a user option to save a particular sunburst visualization, such as the visualization 42, to one or more different formats, such as Graphic Image File (GIF) format, JPEG, and so on.

The view as table menu item 116 provides a user option to display data corresponding to (or otherwise used to generate) the sunburst visualization 42 in a table format. Additional user options, such as for altering underlying data, may be provided via the displayed table, as discussed more fully below with reference to FIG. 5. Altering underlying data is called data brushing herein.

The drill out to application menu item 118 provides a user option to instantiate or otherwise activate a program used to process underlying data, such as one of the ERP applications 24 of FIG. 1. The activated computer program may then be used to modify the underlying data, i.e., to perform data brushing.

For example, users that are using the sunburst visualization 42 to perform detailed analysis/search for anomalies may wish to drill out to the underlying subledger transactions. The present embodiment enables a user to select a sector and drill out to the appropriate application to view the underlying transactions.

While the sunburst visualization 42 provides various user options to facilitate configuring and interacting with the visualization 42 and underlying data via right-click menus or drop-down lists, other types of user interface controls may be employed without departing from the scope of the present teachings. For example, various user interface options of the right-click menu 52 may be provided via buttons, dialog boxes, menu bars, and so on.

In practice, users may use the sunburst visualization 42 iteratively from various perspectives and levels of detail (i.e. pivoting, filtering and magnifying data displayed in the sunburst) in conjunction with other analytical and collaborative reporting tools, e.g., to produce "reports" to be presented to executive management.

Figure 3:
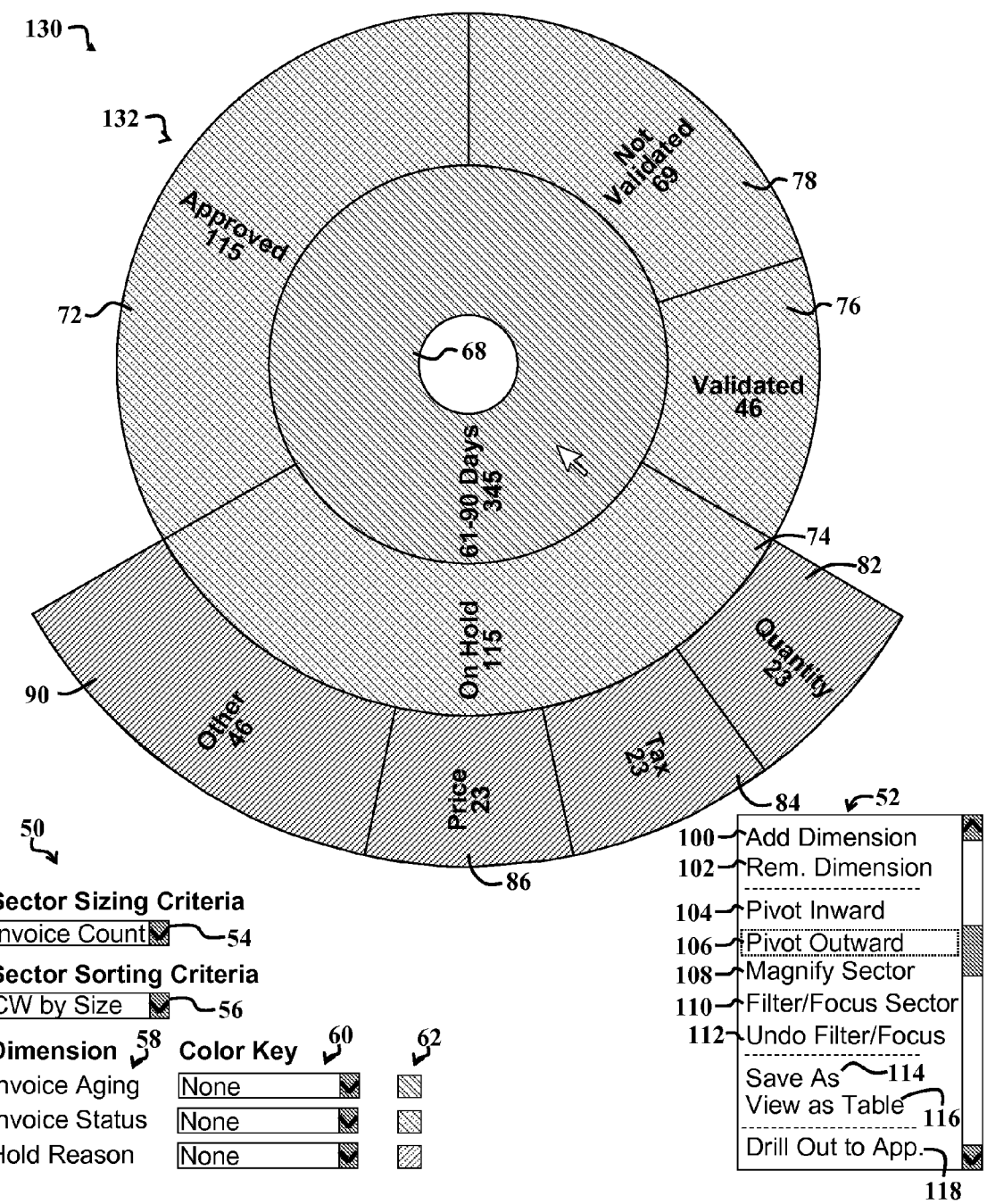
FIG. 3 is a second example user interface screen illustrating a second example sunburst visualization after a filter/focus-sector operation is performed on a sector of the sunburst visualization of FIG. 3.

FIG. 3 is a second example user interface screen 130 illustrating a second example sunburst visualization 132 after a filter/focus-sector operation is performed on a sector 68 of the sunburst visualization 42 of FIG. 3. With reference to FIGS. 2 and 3, note that the sunburst visualization 132 of FIG. 3 represents a rendering of the 61-90 day sector 68 (and its children) of FIG. 2 as a separate sunburst visualization. This occurs after a user has right-clicked the 61-90 day inner sector 68 of the sunburst visualization 42 of FIG. 2 and has chosen the filter/focus sector menu item 110 from the resulting drop-down list 52.

Selection of the filter/focus sector menu item 110 of FIG. 2 is said to trigger filtering of a sunburst visualization or focusing of a selected sector, since information pertaining to other sectors is omitted from the a newly rendered sunburst visualization of the selected sector and included child sectors. The sunburst visualization 42 of FIG. 2 is automatically reconfigured to show the filtered sunburst visualization 132 of FIG. 3 after selection of the filter/focus sector menu item 110 after selection of the 61-90 day sector 68 of FIG. 2.

Conversion of the 61-90 day sector 68 and accompanying child sectors of FIG. 2 into the new sunburst visualization 132 of FIG. 3 involves applying a transformation to the 61-90 day sector 68 that maps the angle originally subtended by the sector 68 to 360 degrees. For example, $(360-\theta)$ may be added to $\theta$, where $\theta$ is the angle originally subtended by the 61-90 day sector 68 of FIG. 1.

Hence, the filter/focus menu item 110 of FIG. 2 provides a user option to cause generation of a newly separated sunburst visualization, e.g., the sunburst visualization 132 of FIG. 3. The new subsequent sunburst visualization 132 renders the right-clicked sector 68 as the center or inner ring.

Figure 4:
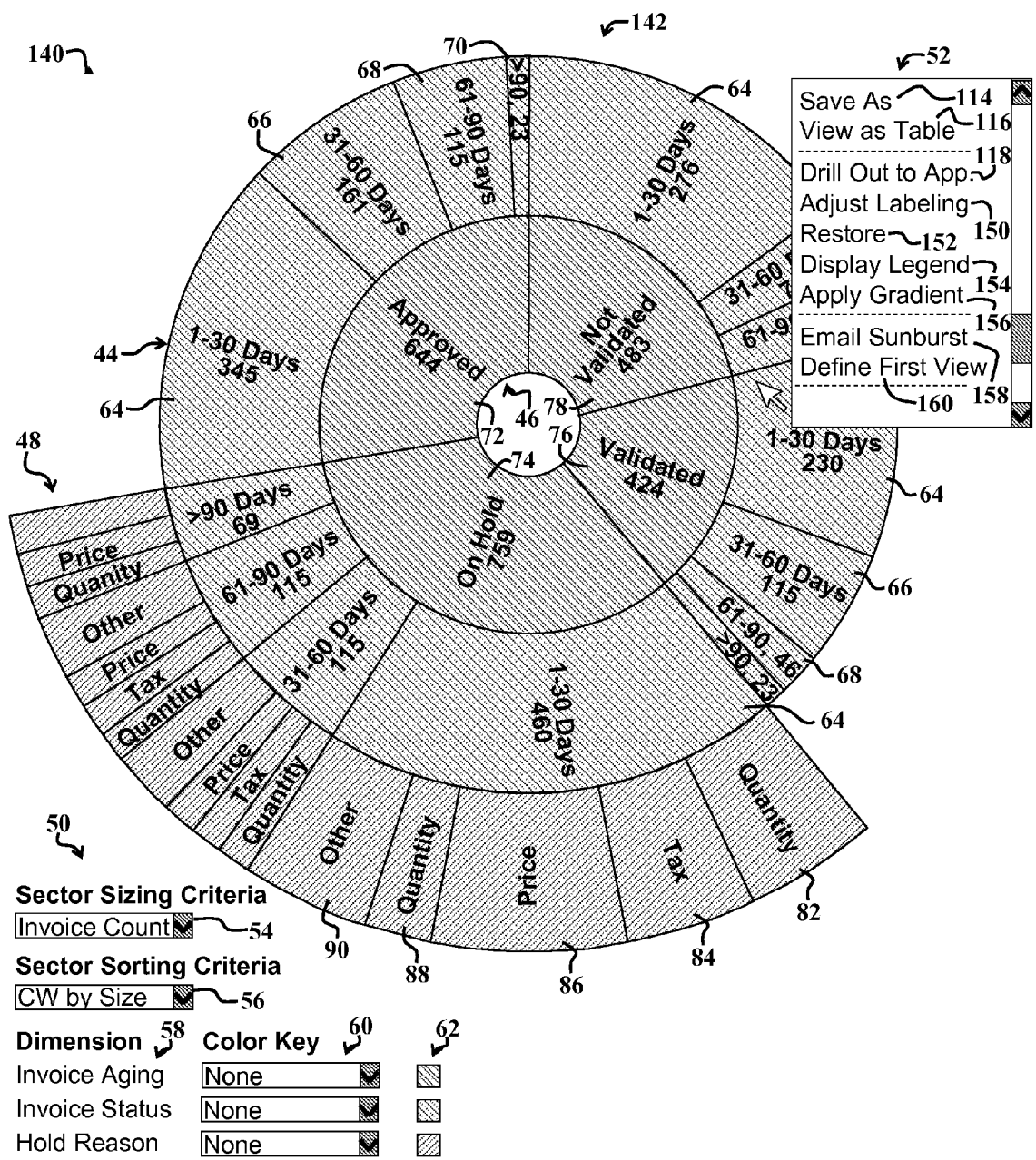
FIG. 4 is a third example user interface display screen illustrating a third example visualization after a pivot-toward-center operation is performed on a ring of the first example sunburst visualization of FIG. 2.

FIG. 4 is a third example user interface display screen 140 illustrating a third example visualization 142 after a pivot-toward-center operation (corresponding to menu item 104) is performed on a ring (e.g., the central ring 46 of FIG. 2) of the example sunburst visualization 42 of FIG. 2. Alternatively, the third example sunburst visualization 142 may appear after the pivot away from center menu item 106 is selected from the drop-down menu 52 and applied to the inner ring 44 of the sunburst visualization 42 of FIG. 2.

The resulting displayed sunburst visualization 142 is automatically configured to maintain organizational consistency (relative sector sizes and portions) between sectors and rings that existed in the previously rendered sunburst visualization 42. For example, if the 1-30 day sector 64 occupies sixty percent of the inner ring 44 (e.g., subtends an angle of 216 degrees) of the visualization 42 of FIG. 2, then in the redrawn visualization 142 of FIG. 4, the sum of the angles subtended by all 1-30 day sectors 64 of the new middle ring 44 of FIG. 4 will occupy sixty percent of the ring 44 (i.e., will subtend a combined angle of 216 degrees).

In the present embodiment, all rings that represent different hierarchical levels or sub-dimensions of a single dimension are moved toward or away from the center of a sunburst together during pivoting operations. In general, dimensions are pivotable, but hierarchical levels within a dimension are not.

For illustrative purposes, the right-click menu 52 shown in FIG. 4 has been scrolled to reveal additional example user interface controls for providing various additional user options. Example additional user interface menu items include an adjust sector labeling 150, restore sunburst 152, display legend 154, apply color gradients/highlights 156, email sunburst 158, and define default first view 160.

Selection of the sector labeling menu item 150 may trigger display of a dialog box that provides additional user interface controls and fields for enabling a user to adjust what metrics are to be displayed for each labeled sector; to adjust labels of dimensions, i.e., rings listed in a color legend; to adjust font and sector labels, and so on.

The restore sunburst menu item 152 is adapted to cause the currently displayed sunburst visualization 142 and screen layout 140 to return to the last saved state or to otherwise restore the sunburst visualization to an original or default state.

The legend menu item 154 may act as a toggle for displaying or hiding a legend. The indicators 62 and accompanying drop-down lists 60 and dimension listing 58 represent an example of a legend with which a user may interact to adjust the display of the sunburst visualization 142. Note that one or more additional, alternative, and/or more detailed legends may be provided without departing from the scope of the present teachings.

Selection of the apply color gradients/highlights menu item 156 may trigger display of a dialog box with user interface controls for enabling a user to adjust the color of sectors within a ring based on a comparison with a predetermined criterion or criteria. Example criteria include percentage Year Over Year (YOY) change, budget variance percentage, absolute YOY change, and so on. In an example highlighting scheme, user options are provided to enable selection of color pairs to represent positive and negative values. For example, a user may specify that green represents positive growth, and red represents negative growth. Color shading (also called highlighting herein) in the sunburst visualization 142 automatically adjusts according to the range of variation of the metric (shading criterion) in each ring. For example, if a maximum variation is +4%, then the brightest red may be assigned to +4%; if the maximum variation is +100%, then the brightest red may be assigned to +100% and a much less strident tone to +4%.

The email sunburst menu item 158 may trigger activation of a predetermined email program and activation of a message dialog box therein with a saved version of the sunburst visualization 142 automatically attached thereto or inserted in an message field. Such functionality may be implemented in part via the application linking and embedding module 20 of FIG. 1.

The define default first view menu item 160 may trigger activation of a dialog box with user interface controls for enabling a user to specify a default or first-view configuration of a particular sunburst visualization.

Various additional user interface features may be provided without departing from the scope of the present teachings. For example, mouse over tooltips functionality may be provided, whereby a user may move a computer mouse graphic over a particular region of the display screen 140 to reveal tips; to view more detailed information about a ring or sector; to view details of criteria used to determine shading or coloring of a sector; and so on, via a hover layer graphic.

Figure 5:
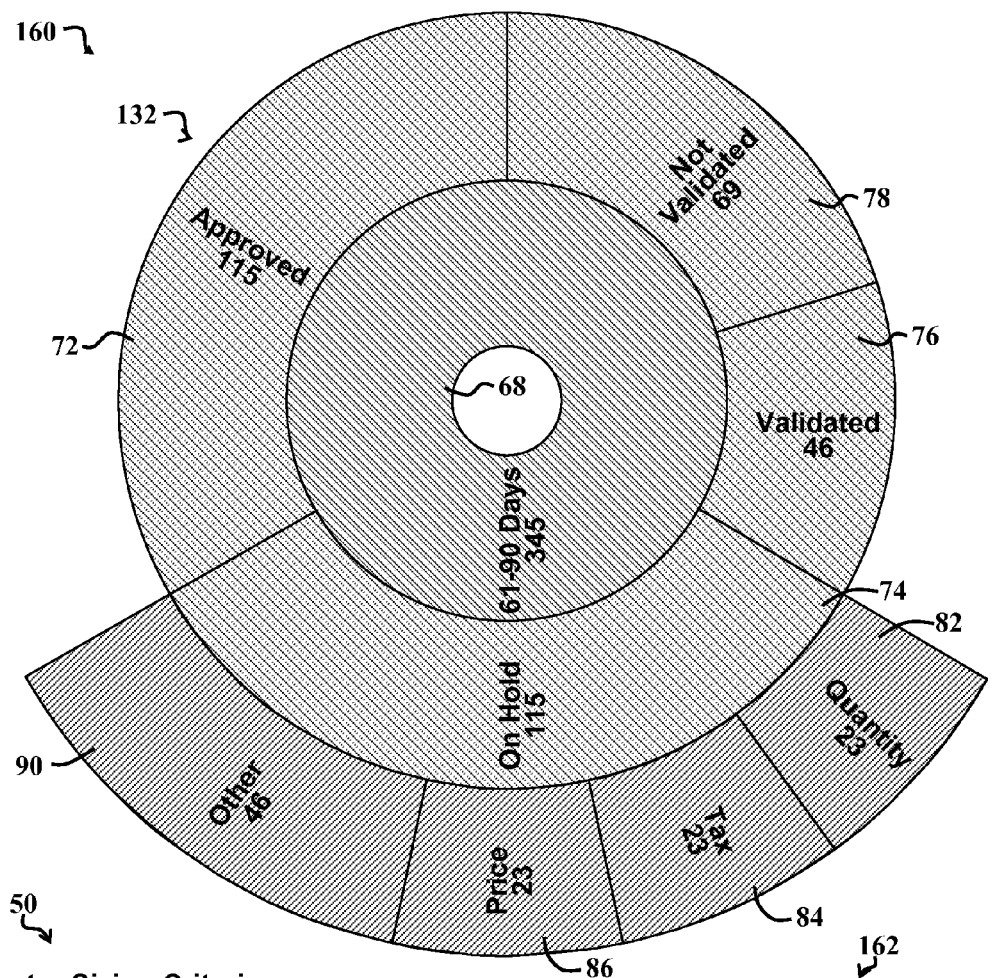
FIG. 5 is a fourth example user interface display screen appearing after a view-as-table operation is performed on the second example sunburst visualization of FIG. 3.

FIG. 5 is a fourth example user interface display screen 160 appearing after a view-as-table operation is performed on the second example sunburst visualization 132 of FIG. 3.

User selection of the view as table menu item 116 may trigger display of a table, such as the table 162, which illustrates data and/or attributes used in the construction of the sunburst visualization 132. In the present embodiment, the table 162 is displayed adjacent to the sunburst visualization 132. However, in practice, the table 132 may be relatively large. In this case, the accompanying sunburst visualization 132 maybe shrunk or hidden to meet the needs of a given implementation.

In addition, or alternatively, desired tables, such as tables used to generate underlying data, may be accessed by selecting the drill out menu item 118. Selection of the drill out menu item 118 may trigger the opening of database software or other application adapted to edit or modify underlying data upon which a given sunburst visualization is based. The triggered database or application may represent the same database or other application that was used to originally create or enter the data underlying the sunburst visualization 132.

Figure 6:
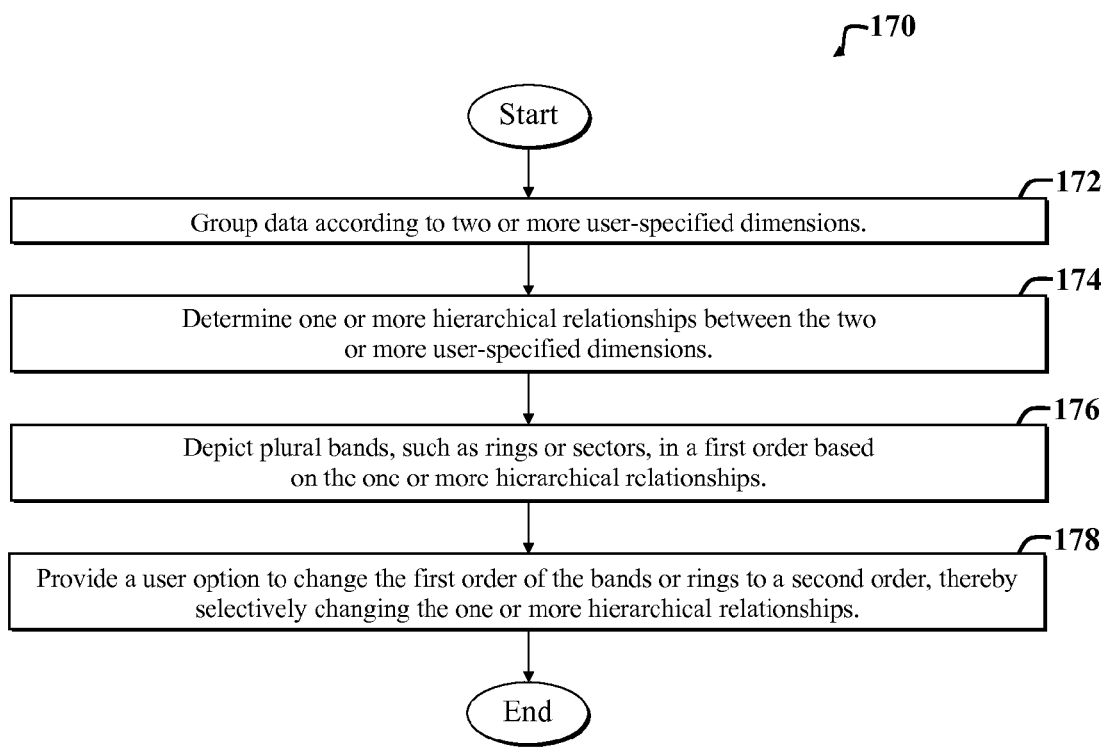
FIG. 6 is a flow diagram of a first example method adapted for use with the system of FIG. 1 and the user interface display screens of FIGS. 2-5.

FIG. 6 is a flow diagram of a first example method 170 adapted for use with the system 10 of FIG. 1 and the user interface display screens 40, 130, 140, 160 of FIGS. 2-5. The example method 170 includes a first step 172, which involves grouping data according to two or more user-specified dimensions. With reference to FIGS. 2 and 6, example dimensions include invoice aging (corresponding to the inner ring 44 of the sunburst visualization 42 of FIG. 2), invoice status (corresponding to the middle ring 46 of FIG. 2), and hold reason (corresponding to the outer ring 48 of FIG. 2).

A second step 174 includes determining one or more hierarchical relationships between the two or more user-specified dimensions. A hierarchical relationship may specify, for example, that a first dimension is considered the inner most or highest dimension; a second dimension is a middle dimension, and a third dimension corresponds to an outer ring or position in the hierarchy or sunburst representation. The initial hierarchical relationship(s) may represent a default or first-view intrinsic hierarchy.

A third step 176 includes depicting plural bands, such as rings or sectors, in a first order based on the one or more hierarchical relationships determined in the second step 174.

A fourth step 178 includes providing a first user option to change the first order of the bands or rings to a second order, thereby selectively changing the one or more hierarchical relationships. Hence, a user may effectively change the hierarchical order of dimensions, thereby implying that the underlying hierarchy or hierarchies is or includes an intrinsic hierarchy.

The method 170 may be changed or augmented without departing from the scope of the present teachings. For example, in a more specific implementation of the method 170, the underlying data is or includes financial data, and the bands represent rings of a sunburst visualization.

Furthermore, as set forth above, the method may further include providing various additional user options, e.g., and option to execute a filter/focus operation on a sector or ring, and option to view data underlying the sunburst visualization as a table, and so on.

Figure 7:
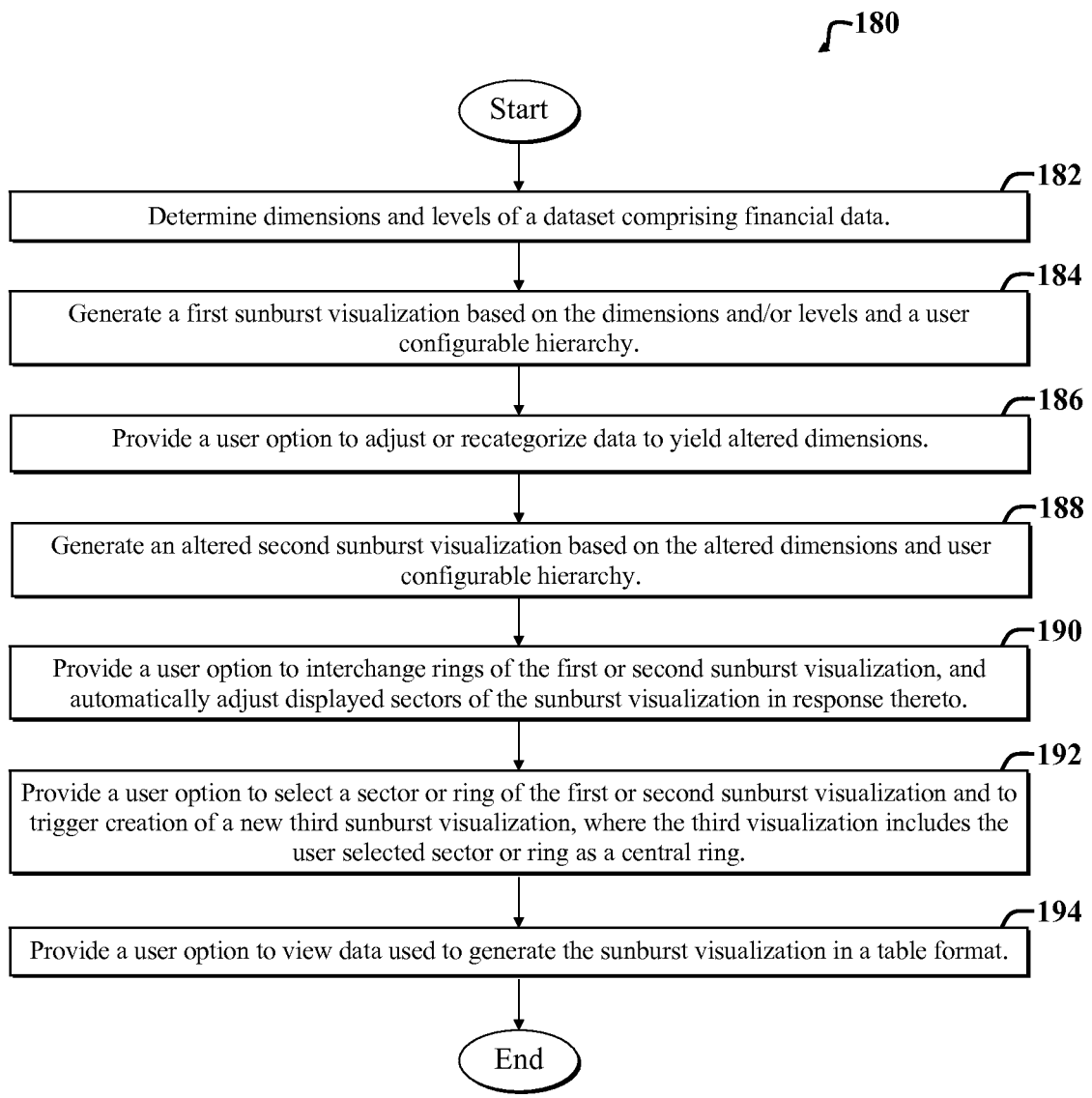
FIG. 7 is a flow diagram of a second example method adapted for use with the system of FIG. 1 and the user interface display screens of FIGS. 2-5.

FIG. 7 is a flow diagram of a second example method 180 adapted for use with the system 10 of FIG. 1 and the user interface display screens 40, 130, 140, 160 of FIGS. 2-5. The second example method 180 includes an initial step 182, which involves determining dimensions and levels of a dataset comprising financial data.

Next, a first sunburst-generation step 184 includes generating a first sunburst visualization based on the dimensions and/or levels and a user configurable hierarchy.

Subsequently, a first option-providing step 186 includes providing a user option to adjust or recategorize data to yield altered dimensions.

Next, a second sunburst-generation step 188 includes generating an altered second sunburst visualization based on the altered dimensions and user configurable hierarchy.

A second option-providing step 190 provides a user option to interchange rings of the first or second sunburst visualization and then automatically adjusting displayed sectors of different rings of the sunburst visualization in response thereto.

A third option-providing step 192 includes providing a user option to select a sector or ring of the first or second sunburst visualization and to trigger creation of a new third sunburst visualization, where the third visualization includes the user selected sector or ring as a central ring. In the third sunburst visualization, displayed sectors and rings are automatically adjusted in accordance with the user adjustable hierarchy.

A fourth option-providing step 194 includes providing a user option to view data used to generate the sunburst visualization in a table format.

The second example method 180 is merely illustrative and may be modified without departing from the scope of the present teachings. In general, while embodiments have been discussed herein with respect to creation of sunburst visualizations based on underlying financial data and intrinsic hierarchies, embodiments are not limited thereto.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for displaying data, the method executing on a computer system, the method comprising:
grouping data according to plural user-specified dimensions;
determining one or more extrinsic hierarchical relationships between the plural user-specified dimensions;
displaying plural concentric bands or portions thereof in a first order based on the one or more extrinsic hierarchical relationships, and providing a visualization in response thereto, wherein each band is concentric about a center of the visualization, wherein each band includes one or more sectors, wherein a line drawn from a sector of an outer band to the center crosses one or more sectors of inner bands such that each inner-band sector crossed has a higher hierarchical relationship to the outer-band sector; and
providing a first user option to change the first order to a second order by exchanging a first concentric band at a first distance to the center with a second concentric band at a second distance to the center, thereby selectively creating or changing one or more intrinsic hierarchies while preserving the one or more extrinsic hierarchical relationships.

2. The method of claim 1, wherein the data includes financial data.

3. The method of claim 2, wherein depicting plural bands includes depicting only bands or portions thereof that are associated with data that a user has access permissions to view.

4. The method of claim 1, further including providing a second user option to omit one or more of the plural bands while maintaining the one or more hierarchical relationships between remaining displayed bands.

5. The method of claim 4, wherein determining further includes
providing a user interface control to enable a user to adjust a hierarchical relationship used to depict the plural bands or portions thereof.

6. The method of claim 4, wherein the concentric bands include bands displayed as rings or portions thereof.

7. The method of claim 6, wherein each of the plural bands include one or more sectors.

8. The method of claim 7, further including providing a third user option to sort sectors of a band according to a user-specified criterion.

9. The method of claim 7, further including providing a fourth user option to select a sector sizing criterion for sizing of depicted sectors of depicted bands.

10. The method of claim 6, wherein depicting further includes illustrating an inner most ring corresponding the first band and illustrating an adjacent ring corresponding to the second band.

11. The method of claim 10, wherein depicting further includes displaying a graphical representation of a hierarchy using concentric rings, wherein adjacent hierarchy levels or dimensions correspond to adjacent rings, with central rings representing higher levels in the hierarchy than outer rings.

12. The method of claim 11, wherein providing the first user option includes providing a user interface control for enabling a user to alter the displayed graphical representation and accompanying hierarchy by selectively changing an order of the rings.

13. The method of claim 12, wherein the displayed graphical representation includes a sunburst visualization with three or more rings corresponding to one or more dimensions of an intrinsic hierarchy used to characterize the data.

14. An apparatus for illustrating data, the apparatus comprising:
one or more processors;
a processor readable storage device coupled to the one or more processors, the processor-readable storage device including one or more instructions for:
grouping data according to plural user-specified dimensions;

determining one or more hierarchical relationships between the plural user-specified dimensions;

displaying plural concentric bands or portions thereof in a first order based on the one or more hierarchical relationships, and providing a visualization in response thereto, wherein each band is concentric about a center of the visualization, wherein each band includes one or more sectors, wherein a line drawn from a sector of an outer band to the center crosses one or more sectors of inner bands such that each inner-band sector crossed has a higher hierarchical relationship to the outer-band sector; and providing a first user option to change the first order to a second order by exchanging a first concentric band at a first distance to the center with a second concentric band at a second distance to the center, thereby selectively creating or changing one or more intrinsic hierarchies while preserving the one or more extrinsic hierarchical relationships.

15. A processor-readable storage device including instructions executable by a digital processor, the processor-readable storage device including one or more instructions for:

grouping data according to plural user-specified dimensions;

determining one or more hierarchical relationships between the plural user-specified dimensions;

displaying plural concentric bands or portions thereof in a first order based on the one or more hierarchical relationships, and providing a visualization in response thereto, wherein each band is concentric about a center of the visualization, wherein each band includes one or more sectors, wherein a line drawn from a sector of an outer band to the center crosses one or more sectors of inner bands such that each inner-band sector crossed has a higher hierarchical relationship to the outer-band sector; and providing a first user option to change the first order to a second order by exchanging a first concentric band at a first distance to the center with a second concentric band at a second distance to the center, thereby selectively creating or changing one or more intrinsic hierarchies while preserving the one or more extrinsic hierarchical relationships.

16. The processor-readable storage device of claim 15, wherein the data includes financial data.

17. The processor-readable storage device of claim 16, wherein depicting plural bands includes depicting only bands or portions thereof that are associated with data that a user has access permissions to view.

18. The processor-readable storage device of claim 15, further including one or more instructions for:

providing a second user option to omit one or more of the plural bands while maintaining the one or more hierarchical relationships between remaining displayed bands.

19. The processor-readable storage device of claim 18, wherein determining further includes providing a user interface control to enable a user to adjust a hierarchical relationship used to depict the plural bands or portions thereof.

20. The processor-readable storage device of claim 18, wherein the concentric bands include bands displayed as rings or portions thereof.

* * * * *

UNITED STATES PATENT AND TRADEMARK OFFICE
CERTIFICATE OF CORRECTION

| | | |
|---|---|---|
| PATENT NO. | : 9,021,397 B2 | Page 1 of 1 |
| APPLICATION NO. | : 13/048781 | |
| DATED | : April 28, 2015 | |
| INVENTOR(S) | : Ramsay et al. | |

It is certified that error appears in the above-identified patent and that said Letters Patent is hereby corrected as shown below:

Title page

On page 2, column 2, under Other Publications, line 1, delete "animatroid." and insert -- antimatroid. --, therefor.

Specification

In column 10, line 7, delete "the a" and insert -- a --, therefor.

Claims

In column 14, line 43, in Claim 10, delete "corresponding the" and insert -- corresponding to the --, therefor.

Signed and Sealed this
Ninth Day of February, 2016

Michelle K. Lee
*Director of the United States Patent and Trademark Office*